United States Patent Office

3,551,156
LIGHT SENSITIVE SILVER HALIDE MATERIALS CONTAINING YELLOW-FORMING COUPLERS
Makoto Yoshida, Momotoshi Tsuda, Kazuya Sano, and Yasushi Oishi, Kanagawa, Japan, assignors to Fuji Shashin Film Kabushiki Kaisha, Ashigara-Kamigun, Kanagawa, Japan, a corporation of Japan
Filed Jan. 23, 1967, Ser. No. 611,066
Claims priority, application Japan, Jan. 24, 1966, 41/3,985
Int. Cl. G03c 1/40
U.S. Cl. 96—100            5 Claims

ABSTRACT OF THE DISCLOSURE

The novel yellow-forming coupler having a lower alkoxyl group at the benzoyl nucleus and a halogen atom at the anilide group of a benzoyl acetoanilide, and shown by

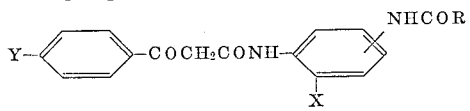

has been found to have a high coupling reactivity and a sufficient solubility in organic solvents as well as to provide a yellow image of excellent fastness and a spectral absorption suitable for color photography.

BACKGROUND OF THE INVENTION

The following three methods of incorporating a diffusion resistant coupler in a photographic emulsion layer have hitherto been known:

(1) Water solution method: neutral or alkaline aqueous solution of the coupler carrying a carboxyl group or a sulfonic acid group, is added into the emulsion and the mixture neutralized if needed.

(2) Oil-solution method: The coupler is dissolved in an organic solvent, dispersed into an aqueous medium to fine colloidal particles and then added into the emulsion.

(3) A coupler melt is added into the emulsion directly or in the form of aqueous dispersion.

In order to constitute a blue sensitive emulsion layer by use of a yellow-forming coupler of the oil-solution type, it is required that the coupler have a high coupling reactivity with the oxidation product of the developing agent, that the yellow dye image formed by color development have a light absorption adapted for the color reproduction, and that the yellow dye stands severe storing conditions, and that the coupler have no bad influence upon the photographic emulsion. Furthermore, the coupler must be easily dissolved in the organic medium used and must not crystallize during storage.

Since the commonly used yellow-forming couplers of the oil-solution type do not have high coupling reactivities against the oxidation product of a developing agent in the dispersed state in the emulsion layer, a blue sensitive emulsion layer having excellent photographic characteristic has been difficultly obtained in such a system. The change in the chemical structure of a yellow-forming coupler (such as a substituted benzoylacetanilide) as would impart high coupling reactivity to it tends to shift the spectral absorption of the resulting yellow dye to the longer wave length, causing the increase of the green absorption which is not desirable from the view point of color reproduction. That is to say, it has been believed that a general inconsistent relationship exists between the desired light absorption of a yellow-forming coupler and its coupling reactivity.

Moreover, the dye image from the known yellow-forming coupler tends to fade, in particular, under exposure to a strong light for a long time, which is a great obstacle for the long preservation of color photographs. In the field of color photography, therefore, a number of efforts have been made to obtain a yellow-forming coupler having a high coupling reactivity, and giving a light-durable yellow image without green absorption.

SUMMARY OF THE INVENTION

This invention relates to novel light sensitive materials for color photography, in which yellow-forming couplers are incorporated. In the substrative process of color photography, cayn, magenta and yellow dyes are formed during development of silver halide by coupling of the oxidation product of a developing agent such as N,N-disubstituted-p-phenylene-diamine with suitable couplers.

In the system where spectrally sensitized silver halide emulsions contain the corresponding couplers, the couplers have to be made resistant to diffusion in order to prevent deterioration of color reproduction due to diffusion of the couplers through the layers. It is necessary, therefore, to introduced in the coupler molecule ballast groups having ten or more carbon atoms serving to render it indiffusible.

DESCRIPTION OF THE PREFERRED EMBODIMENTS

In accordance with the present invention, there is provided a light sensitive material for color photography, containing a novel yellow-forming coupler represented by the general formula,

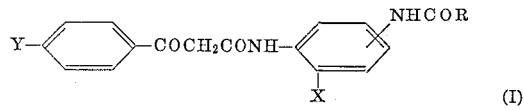
(I)

wherein X is a halogen atom, Y is an alkoxyl group of 1–3 carbon atoms and —COR is an acyl group of 9–28 carbon atoms.

The foregoing novel coupler used in this invention has a high coupling reactivity and sufficient solubility in organic solvents, and it gives a yellow image of excellent fastness and spectral absorption for color reproduction. The color photographic material produced by the use of this novel coupler is characterized by good photographic properties concerning sensitivity, gradation and image quality as well as by the ease of production, the photographic image obtained from this material being adequately stable even under severe conditions. Other merits or features of the invention will be hereinafter illustrated.

The new couplers of our invention, represented by the general Formula I, exhibit a similar or even high coupling reactivity in comparison with the known couplers having the highest coupling reactivity as are represented by the following general Formula II where X and COR have the same meaning as in I. In addition, the dyes formed from them exhibit much less green absorption undesirable from the standpoint of color reproduction of the subtractive process. Thus, a less reddish, sharp yellow image can be obtained.

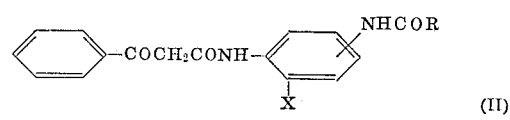
(II)

In this general formula, X and —COR have the same meaning in the general Formula I.

Figure 1:
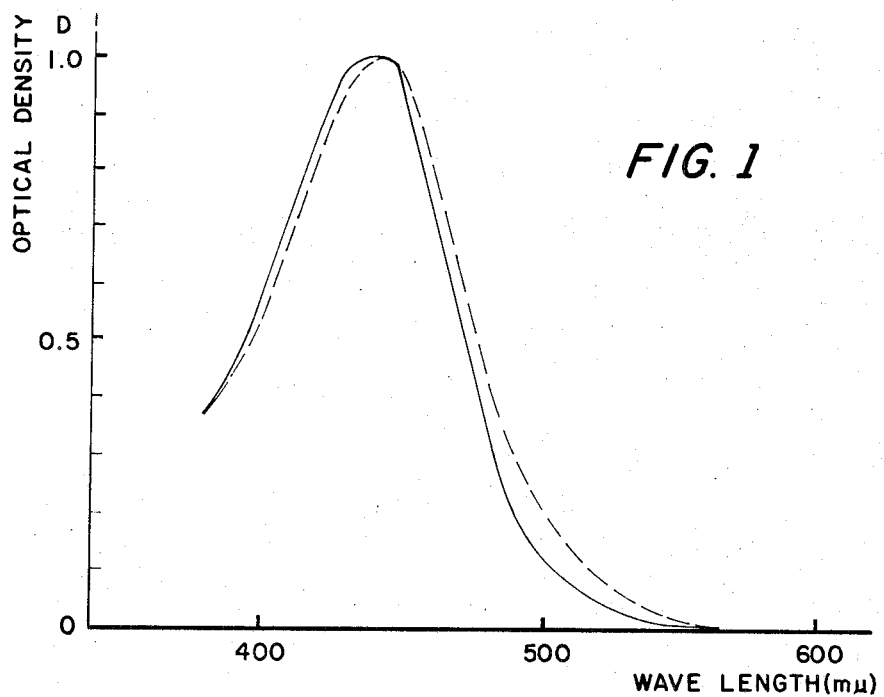
FIG. 1 is a spectral absorption curve of the ethyl acetate solution of the yellow dye from anisoylaceto-(2-chloro-5-(2,4-di-tert - amylphenoxyacetamide)) anilide, a coupler of the general Formula I (Curve A)

In FIG. 1 are shown the spectral absorption curve of the ethyl acetate solution of the yellow dye from anisoyl-aceto-(2-chloro-5-(2,4-di-tert - amylphenoxyacetamide))-anilide, a coupler of the general Formula I (Curve A) to be compared with that of another yellow dye from benzoyl-(2-chloro-5-(2,4-tert-amylphenoxyacetamide))anilide, a known coupler of the general Formula II (Curve B).

FIG. 1 shows that the former curve is steeper to the longer wave length than the latter, resulting in less green absorption over 500 millimicrons. It is evident from these results that the color photographic material of our invention gives a high blue sensitivity, yellow density and good gradation, while giving a less reddish hue.

Furthermore, the novel coupler of the invention has such a feature that the yellow image obtained is not only durable to attacks of heat and humidity, but fades to a much less extent even under exposure to a strong light. Consequently, a photograph obtained by developing the color photographic material of this invention can be preserved under severe conditions.

To the incorporation of the coupler of this invention into a photographic emulsion, various procedures can be satisfactorily applied, typical of which are the followings.

(a) Dissolving the coupler in a less water-soluble, less volatile solvent (B.P. 200° C. or more), dispersing the resulting coupler solution in an aqueous medium, emulsifying and then adding it to the emulsion. Di-in-butyl phthalate, tricrsyl phosphate and N,N-di-ethylcaproic acid amide are examples of such organic solvents.

(b) Dissolving the coupler in a low boiling, relatively water-insoluble solvent, dispersing the resulting solution in an aqueous medium and adding it to the emulsion. The organic solvent used is removed off during the later steps. Ethyl acetate, cyclohexanone or tetrahydrofuran is used as such a solvent.

(c) Dissolving the coupler in a water-miscible organic solvent and adding the resulting coupler solution to a photographic emulsion. The coupler is dispersed in the emulsion as fine colloidal particles. The solvent used may be either removed during the following step of making the photographic material, or retained in the emulsion layer. Illustrative of such solvent are dimethyl-formamide, dimethylsulfoxide, N-methylpyrrolidone and glycerine.

The dispersion of the coupler can be facilitated by using a mixture of such solvents as given in (a), (b) and (c) depending on the solubility of the coupler used.

In order to make up a blue sensitive photographic emulsion layer having excellent properties, it does not matter whether only one of the couplers represented by the general Formula I is used or two or more of them are used, or whether a yellow-forming coupler not represented by the general Formula I are jointly used. As occasion demands, a yellow-forming coupler of water-soluble type may be jointly used in the same emulsion layer.

When the yellow-forming coupler represented by the general Formula I is used together with a cyan- or magenta-forming coupler in the same emulsion layer, the color reproductivity can be improved, as disclosed in Japanese patent publication No. 391/1965.

The coupler of this invention can be satisfactorily applied to various color photographic materials, for example color printing paper, color positive film, color negative film and color reversal film.

Our invention is applicable not only to color photographic materials of the so-called multi-layer type where two or more emulsion layers each containing spectrally sensitized silver halide and the corresponding nondiffusing coupler are superposed on one support, but also, to the so-called mixed grain type material where two or more kinds of fine grains each containing spectrally sensitized silver halide and the corresponding nondiffusing coupler are mixed and coated on one support.

The yellow-forming coupler of this invention has been expressed by the foregoing general Formula I in which COR is an acyl group of 9–28 carbon atoms.

Those carrying less than 9 carbon atoms partly go into the alkaline developing solutoin and diffuse into other layers resulting in worsening of the color reproductivity, since the aggregation force within the coupler molecules or between the coupler molecule and solvent molecule is insufficient. On the other hand, when the number of carbon atoms exceeds 28, the blue extinction per weight (i.e., volume) of the yellow dye formed becomes too small for the emulsion layer to keep the blue density sufficient without increasing the thickness of the emulsion layer.

In the foregoing general Formula I, it is the most desirable from the standpoint of the coupling reactivity and solubility of the coupler and the absorption of the resulting dye that the substituent NHCOR is positioned at the 4- or better at 5-position of the 2-halogen-anilide nucleus.

The typical examples of the couplers used in the present invention are as follows, but the invention is not to be limited thereby.

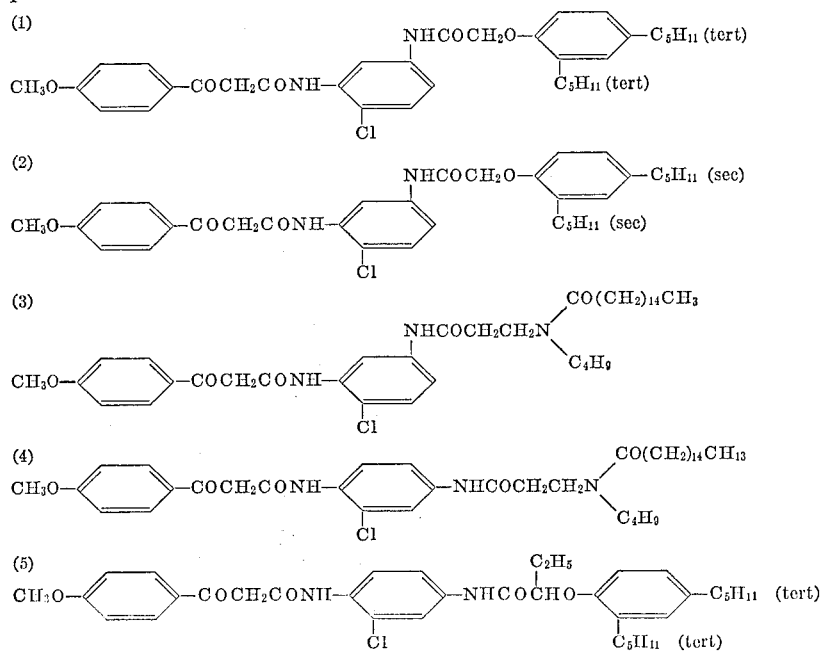

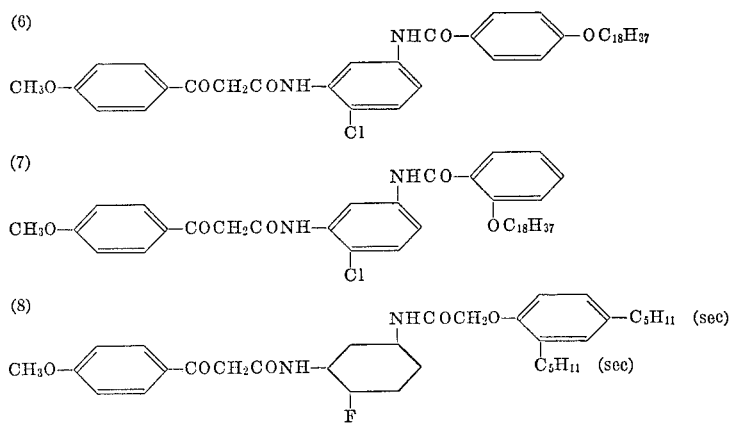

Examples of synthesizing some of these compounds will be given.

Example of synthesis (1): synthesis of compound (1)

(a) Synthesis of anisoylaceto-(2-chloro-5-nitro)anilide; 100 g. of 2-chloro-5-nitroaniline and 127 g. of ethyl anisoylacetate were heated in an oil bath at 160° C. for 1.5 hours. The reaction mixture was crystallized in methanol and reprecipitated from dimethylformamide-methanol.

(b) Synthesis of anisoylaceto-(2-chloro - 5 - amino) anilide; 85 g. of the nitro-compound obtained in (a) was mixed with 50 g. of reduced iron powder and 1.2 l. of ethanol, to which 225 ml. of acetic acid and 200 ml. of water were added dropwise within 2–3 minutes. After stirring for 30 minutes, 300 ml. of the ethanol was distilled off. 500 ml. of ice was added to remove insoluble contaminants. Caustic soda was added to adjust pH to 11, then water was added to 1000 ml. in order to remove iron hydroxide. Reprecipitation followed by recrystallization were done from acetic acid and ethanol respectively. 51 g. of an amino-compound melting at 146° C. was obtained.

(c) Synthesis of compound (1); 10 g. of the amino-compound obtained in (b) was mixed with 10 g. of 2,4-di-tert-amylphenoxyacetyl chloride, 10 ml. of pyridine and 30 ml. of acetone and heated on a water bath. After 1 hour, the half amount of the acetone was distilled off and the solution was poured into water, and the aqueous phase decanted. Methanol was added for crystallization. Recrystallization from ethanol gave 12 g. of compound (1) melting at 140° C.

Example of synthesis (2): synthesis of the compound (2)

10 g. of the amino-compound obtained in (b) of the foregoing example was suspended in 100 ml. of acetonitrile, to which 5 g. of triethylamine was then added and 10 g. of 2,4-di-sec-amylphenoxyacetyl chloride was dropped in the form of a solution in 20 ml. of acetonitrile with stirring at room temperature. Stirring was further continued for 20 minutes and the triethylamine salt formed was filtered off. The mixture was poured into water, the aqueous phase decanted, and the residue was crystallized by use of methanol and recrystallized from ethanol. 9 g. of compound (2) melting at 110° C. was obtained.

Example of synthesis (3): synthesis of the compound (3)

43 g. of the amino-compound obtained in (b) of example of synthesis (1) was suspended in 300 ml. of acetone, to which 16 g. of triethylamine was added and into this suspension a sufficiently degassed acid chloride from 53.5 g. of 3 - (N-butylhexadecanamide)-propionic acid (cf. Japanese Pat. 427,977 entitled "Color photographic material") and 19 g. of thionyl chloride was dropped with ice-cooling and stirring in the form of a solution in 50 ml. of acetone. After dropping, stirring was continued for 20 minutes, and the triethylamine salt was filtered off. After acetone was distilled off, the mixture was poured into water, and the aqueous phase was decanted. Crystallization in methanol followed by recrystallization from ethanol gave 24 g. of a crystalline material melting at 95.5° C.

Example of synthesis (4): synthesis of compound (4)

(a') Synthesis of anisoylaceto-(2-chloro - 4 - nitro) anilide; 172.5 g. of 2-chloro-4-nitroaniline and 222 g. of ethyl anisoylacetate were heated in an oil bath at 160° C. for 1.5 hours. The reaction mixture was crystallized in methanol and reprecipitated from dimethylformamide-methanol. 80 g. of the compound melting at 157–8° C. was obtained.

(b') Synthesis of anisoylaceto-(2-chloro - 4 - amino) anilide; into the mixture consisting of 40 g. of the nitro-compound obtained in (a'), 50 g. of reduced iron powder and 150 ml. of ethanol were added 250 ml. of acetic acid and 200 ml. of water dropwise. The mixture was treated in the similar manner to (b) of example of synthesis (1) and was recrystallized to give 18 g. of crystals melting at 145–7° C.

(c') Synthesis of the compound (4); 31 g. of the amino-compound obtained in (b'), 500 ml. of acetone and 15 g. of triethylamine were mixed together, to which the sufficiently degassed acid chloride from 38 g. of 3-(N-butyl-hexadecanamide)-propionic acid and 13 g. of thionyl chloride was added dropwise in the form of a solution in 100 ml. of acetone. Stirring was continued for 20 minutes longer and the mixture was poured into ice water, the resulting oily product being allowed to stand for one night to yield a solid material. Recrystallization from acetonitrile and then from methanol gave 15 g. of the compound (4) melting at 109–110° C.

The following examples are given in order to illustrate the embodiments of our invention.

EXAMPLE 1

15 g. of coupler (1), 20 ml. of di-n-butyl phthalate and 30 ml. of cyclohexanone were heated together at 60° C. to prepare a solution, which was then added to 300 ml. of an aqueous solution containing 25 g. of gelatin and 1 g. of sodium dodecylbenzenesulfonate and maintained at 60° C. This was stirred vigorously by means of a homogenizer for 30 minutes. The coupler was finely emulsified with the solvent.

All the emulsified dispersion was mixed with 500 g. of photographic emulsion containing 45 g. of silver iodobromide and 50 g. of gelatin, to which 30 ml. of a 3% acetone solution of triethylene phosphoramide was added as a hardener, and the pH was adjusted to 7.0. The resulting emulsion was applied to cellulose film base to be $8.0 \times 10^{-4}$ cm. thick on dry base.

A sharp yellow image obtained by exposing and processing of the obtained film according to the following procedures.

(I) Color developing treatments

|     | | Minutes |
| --- | --- | --- |
| (1) | color development at 21° C. | 10 |
| (2) | rinsing at 21° C. | 1 |
| (3) | first fixing at 21° C. | 4 |
| (4) | rinsing at 21° C. | 3 |
| (5) | bleaching at 21° C. | 3 |
| (6) | rinsing at 21° C. | 2 |
| (7) | second fixing at 21° C. | 3 |
| (8) | rinsing at 18° C. | 20 |

(II) Color developing solution A (pH=10.5)

Water—1000 ml.
4 - amino - 3 - methyl-N,N-diethylaniline hydrochloride—2.5 g.
Sodium sulfite (anhydrous)—10 g.
Sodium carbonate (monohydrate)—47 g.
Potassium bromide—2 g.

(III) Fixing solution (pH=4.5)

Water—1000 ml.
Sodium thiosulfate (hexahydrate)—80 g.
Sodium sulfite (anhydrous)—5 g.
Borax—6 g.
Glacial acetic acid—4 ml.
Potassium alum—7 g.

(IV) Bleaching bath (pH=7.2)

Water—1000 ml.
Potassium ferricyanate—100 g.
Boric acid—10 g.
Borax—5 g.

EXAMPLE 2

10 g. of the coupler (2), 5 ml. of tricresyl phosphate and 20 ml. of ethyl acetate were heated at 60° C. to prepare a solution, which was then added to 100 ml. of an aqueous solution containing 0.5 g. of sodium higher-alkylsulfonate and 7 g. of gelatin at 60° C. and vigorously stirred by means of a homogenizer. The coupler was finely dispersed with the solvent.

All the emulsified dispersion was mixed with 540 g. of a blue sensitive photographic emulsion containing 30 g. of silver chlorobromide, 35 g. of gelatin, 30 ml. of a 3% acetone solution of triethylene phosphoramide as a hardening agent, and 7 g. of polyvinylpyrrolidone, and then applied to baryta paper to be a first layer of $4 \times 10^{-4}$ cm. in thickness on dry base.

A green sensitive photographic emulsion containing emulsified dispersion of the coupler (a) represented by the following structure was further applied thereto as a second layer, and a red sensitive photographic emulsion containing an emulsified dispersion of the coupler (b) was superposed as a third layer.

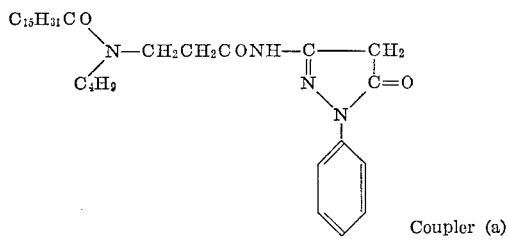

Coupler (a)

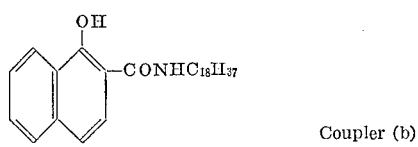

Coupler (b)

The so obtained color printing paper was subjected to wedge exposure to blue light and then to developing treatments similar to Example 1 except that the color development was carried out at 21° C. for 12 minutes by use of the following developing solution.

(V) Color developing solution B

Water—1000 ml.
Sodium sulfite (anhydrous)—2 g.
N-hydroxyethyl-N-ethyl - p - phenylenediamene sulfate—4.5 g.
Potassium carbonate—75 g.
Tribasic potassium phosphate—10 g.
Potassium bromide—2 g.
Hydroxylamine hydrochloride—2 g.

The resulting sharp yellow image exhibited a good sensitivity, gradation and maximum density required for color printing papers. The yellow of a color print obtained from this color printing paper hardly faded even after a long period of exposure.

EXAMPLE 3

(i) Film K: 15 g. of the coupler (3) of our invention, 20 ml. of di-n-butyl phthalate and 30 ml. of ethyl acetate were heated at 60° C. to prepare a solution, which was added to 300 ml. of an aqueous solution containing 25 g. of gelatin and 1 g. of sodium dodecylbenzenesulfonate at 60° C. and vigorously stirred for 30 minutes by means of a homogenizer. The coupler was finely emulsified or dispersed with the solvent.

All the emulsified dispersion was mixed with 500 g. of a photographic emulsion containing 45 g. of silver iodobromide and 50 g. of gelatin, to which 30 ml. of a 3% acetone solution of triethylene phosphoramide was added as a hardening agent, and the pH was adjusted to 7.0. The resulting emulsion was applied to cellulose acetate film base to be $8.0 \times 10^{-4}$ cm. thick on dry base.

Figure 2:
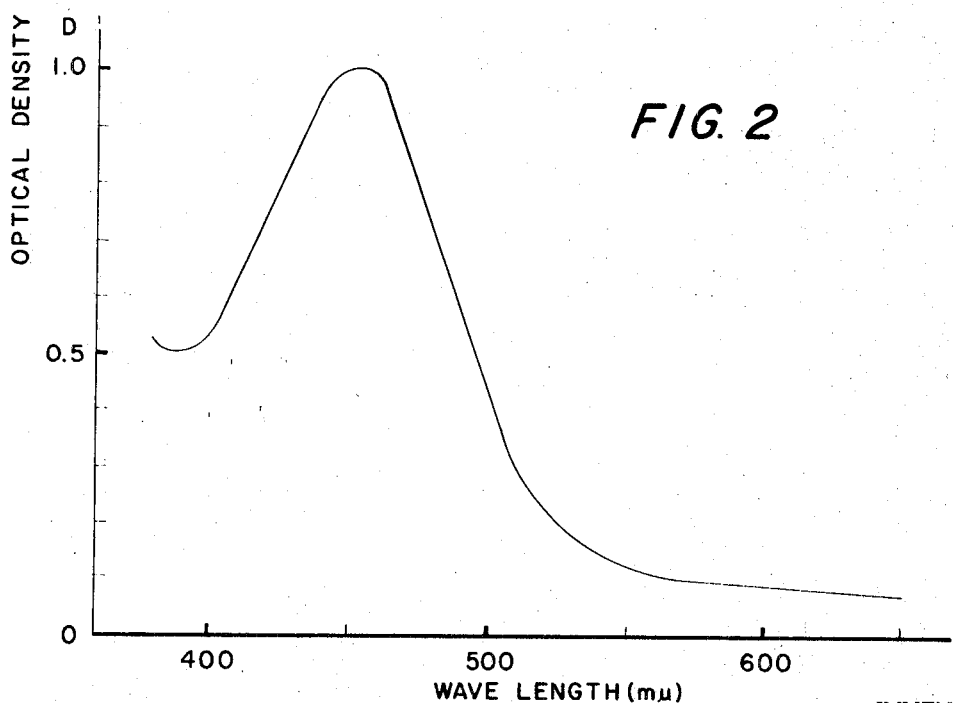
FIG. 2 relates to Example 3 and is the spectral absorption curve of the yellow image.

The film K was exposed and developed in the similar manner to Example 1 to give a sharp yellow image. The spectral absorption curve of the yellow image is shown in FIG. 2.

(ii) Film L: Film L was obtained in the similar manner to the film K except that the known coupler (c) of the following formula which is included in the general Formula II was used in place of the yellow-forming coupler (3).

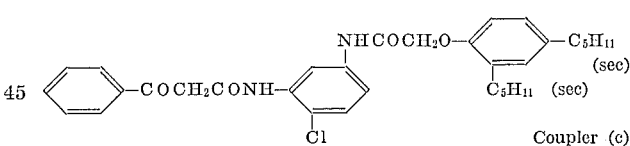

Coupler (c)

(iii) Film M: 15 g. of a yellow-forming coupler (d) having the following formula was dissolved in the mixture of 100 ml. of distilled water, 15 ml. of methanol and 50 ml. of 1 N caustic soda solution to prepare a solution, which was then added with stirring to 500 g. of a photographic emulsion containing 45 g. of silver iodobromide and 50 g. of gelatin. 90 ml. of a 3% aqueous solution of saponin and a 10% aqueous solution of citric acid in an amount sufficient to adjust the pH to 7.0 were added thereto and the resulting emulsion, diluted with 200 ml. of water, was applied to cellulose triacetate film base to be $8.0 \times 10^{-4}$ cm. thick on dry base.

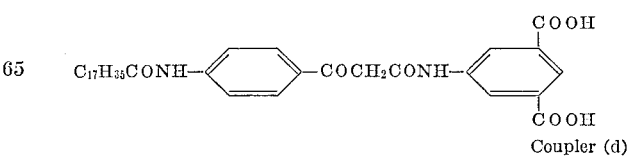

Coupler (d)

The above mentioned three kinds of films L, K and M were subjected to the developing treatments similar to Example 1 to give yellow images. After the films thus processed were kept at a constant temperature and humidity vessel at 65° C. and 75% RH the lowering of extinction was measured with the yellow image. The results are shown in Table 1.

TABLE 1.—DEGREE OF FADING DUE TO HEAT AND HUMIDITY
[Percent, ratio of density lowering to initial density]

| | Coupler | Preservation period | | | |
|---|---|---|---|---|---|
| | | 0 day | 5 days | 10 days | 20 days |
| Film: | | | | | |
| L | (3) | 0 | 0 | 3 | 4 |
| K | (c) | 0 | 2 | 4 | 5 |
| M | (d) | 0 | 15 | 35 | 65 |

It will be understood from these data that the coupler (3) of our invention yields a yellow image strongly resistant to attack of heat and humidity.

The three kinds of the film L, K and M developed in the similar manner to Example 1, were exposed to strong light from xenon lamp for 20 hours and the lowering of extinction of the yellow image was measured. The results are shown in Table 2.

TABLE 2.—DEGREE OF FADING DUE TO LIGHT
[Percent, ratio of lowering of density to initial density]

| | Coupler | Initial density | |
|---|---|---|---|
| | | 1.0 | 2.0 |
| Film: | | | |
| L | (3) | 13 | 10 |
| K | (c) | 23 | 18 |
| M | (d) | 65 | 45 |

It will apparently be understood from these data that the coupler of our invention (3) yields yellow images more resistant to intense exposure, as compared with the commonly used couplers in the prior art.

We claim:

1. A light-sensitive material for color photography, comprising a support bearing thereon a silver halide emulsion layer containing at least one yellow-forming coupler represented by the general formula

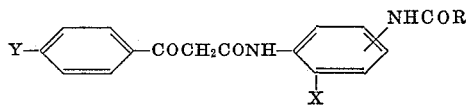

wherein X represents a halogen atom, Y represents an alkoxy group having 1 to 3 carbon atoms and —COR represents an acyl group having 9 to 28 carbon atoms.

2. A light-sensitive material as claimed in claim 1, wherein said yellow-forming coupler is represented by the formula

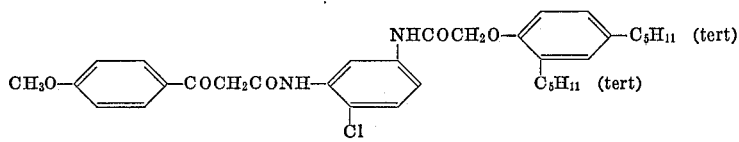

3. A light-sensitive material as claimed in claim 1, wherein said yellow-forming coupler is represented by the formula

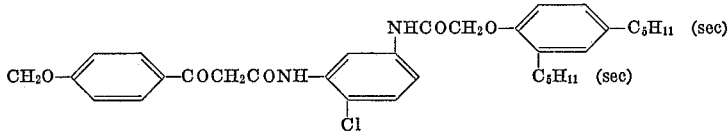

4. A light-sensitive material as claimed in claim 1, wherein said yellow-forming coupler is represented by the formula

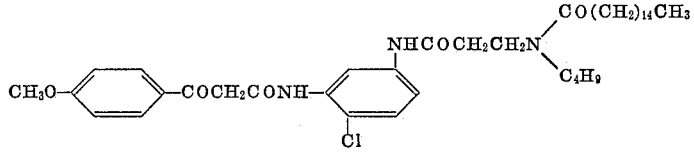

5. A light-sensitive material as claimed in claim 1, wherein said yellow-forming coupler is represented by the formula

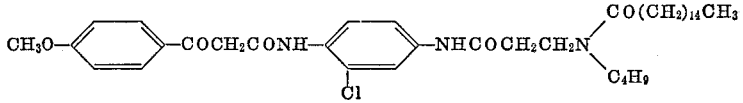

References Cited

UNITED STATES PATENTS 2,407,210   9/1946   Weissberger et al. _____ 96—100

OTHER REFERENCES

Brown et al., Journal American Chemical Society, vol. 79, pp. 2919–27, (1957).

J. TRAVIS BROWN, Primary Examiner

U.S. Cl. X.R.

96—55, 74